United States Patent
Smith

(10) Patent No.: US 10,054,236 B2
(45) Date of Patent: Aug. 21, 2018

(54) PRESSURE RELIEF SYSTEM AND METHOD

(71) Applicant: Strom W. Smith, Gulfport, MS (US)

(72) Inventor: Strom W. Smith, Gulfport, MS (US)

(*) Notice: Subject to any disclaimer, the term of this patent is extended or adjusted under 35 U.S.C. 154(b) by 0 days.

(21) Appl. No.: 15/668,263

(22) Filed: Aug. 3, 2017

(65) Prior Publication Data

US 2017/0328488 A1 Nov. 16, 2017

Related U.S. Application Data

(63) Continuation-in-part of application No. 14/881,451, filed on Oct. 13, 2015, now Pat. No. 9,752,696.

(60) Provisional application No. 62/063,029, filed on Oct. 13, 2014.

(51) Int. Cl.
*F16K 17/18* (2006.01)
*F16K 27/02* (2006.01)
*F16K 17/02* (2006.01)
*F16K 49/00* (2006.01)

(52) U.S. Cl.
CPC .......... *F16K 17/18* (2013.01); *F16K 27/0209* (2013.01); *F16K 17/02* (2013.01); *F16K 49/005* (2013.01)

(58) Field of Classification Search
CPC .... F16K 27/0209; F16K 17/02; F16K 49/005; F16K 17/18
USPC .............................................. 137/514, 514.3
See application file for complete search history.

(56) References Cited

U.S. PATENT DOCUMENTS

| 2,092,793 A | | 9/1937 | Abercrombie | |
| 2,888,038 A | * | 5/1959 | Smalley | F16K 21/18 137/247.15 |
| 3,294,116 A | * | 12/1966 | Tremeau | F16K 15/026 137/533 |
| 4,121,619 A | | 10/1978 | Pauliukonis | |
| 6,155,313 A | * | 12/2000 | Smalley | B60C 29/062 141/311 R |

* cited by examiner

*Primary Examiner* — Craig Schneider
*Assistant Examiner* — P. Macade Nichols
(74) *Attorney, Agent, or Firm* — Keeling Law, LLC; Kenneth A. Keeling; Mark S. Solomon

(57) ABSTRACT

Embodiments of the present invention generally include a pressure relief system and methods of use, in which an apparatus includes an upper chamber fluidly connected to a pressurized fluid source, a lower chamber having an inlet and an outlet, a vertically moveable plate intermediate the chambers and disposed within a plate support, and connected to the plate by a vertical shaft, a vertically actuating lower chamber inlet valve including an inlet seal. Pressure relief is accomplished by controlling fluid pressure in the upper chamber such that varying downward force on the plate and therefore, via the shaft, the inlet seal, allows for selective opening/closing of the inlet valve as a function of upper chamber fluid pressure relative to the pressure exerted from a fluid source for which pressure relief is desired, beneath the inlet seal, whereby over-pressured fluid entering the lower chamber via the inlet is vented out the outlet.

25 Claims, 9 Drawing Sheets

PRESSURE RELIEF SYSTEM AND METHOD

CROSS-REFERENCE TO RELATED APPLICATIONS

This application is a continuation-in-part of prior U.S. patent application Ser. No. 14/881,451, filed Oct. 13, 2015, which claims the benefit of U.S. Provisional Patent Application No. 62/063,029, filed Oct. 13, 2014, which applications are incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention relates to pressure regulators for fluids. More particularly, the present invention provides a pressure relief valve controlling flow of fluids in an industrial application such as a sulfur trap.

Description of the Related Art

Pressure relief valves are widely used in all types of industry where protection against over-pressurization of fluids is desirable. Pressure relief valves for large applications, such as industrial applications and sulfur trap pressure relief valves, are commonly rupture release systems that cannot reseal themselves. While other pressure relief valves are designed to be self-resealing, many resealing pressure relief valves in the prior art utilize metallic springs in their operation. A disadvantage with these relief valves is that the springs weaken with age. The weakened spring jeopardizes the accuracy and reliable operation of the relief valve. Other presently available pressure relief valves utilize flexible diaphragms or discs in their operation. A disadvantage with these relief valves is that the diaphragms tend to lose their flexibility with age, and can rupture without warning. In that event, the valve may provide no protection at all from over-pressurization of the fluid.

A need therefore exists for a pressure relief valve that is self-resealing but does not utilize springs or flexible diaphragms for its operation. It is also desirable that the relief valve will be capable of being tested without its disconnection or removal from its service position.

BRIEF SUMMARY OF THE INVENTION

The present invention is a pressure relief system and method. According to various embodiments of the invention, there is provided a pressure relief system which comprises an apparatus that includes an upper chamber and a lower chamber. The lower chamber comprises a fluid inlet, which is selectively openable/closeable by manipulation of a vertically moveable seal component, and a fluid outlet. The inlet is fluidly connected to a process fluid for which pressure relief protection is desired. The outlet is fluidly connected to any process location to which over-pressure process fluid may be directed. In these embodiments, a vertically moveable plate is disposed between the two chambers and is connected to the seal component. Pressure applied to the upper surface of the plate provides controllable resistance to opening of the seal, which allows for control of the fluid pressure at which the seal is moveable to provide the desired pressure relief. Other features and advantages of the invention will be apparent from the following description, the accompanying drawings, and the appended claims.

BRIEF DESCRIPTION OF THE DRAWINGS

For a more complete understanding of the present invention and the advantages thereof, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

As used herein, the terms up, upward, upper, down, downward, lower, and like directional indications are for descriptive reference only as the system is operable in various orientations.

Figure 1:
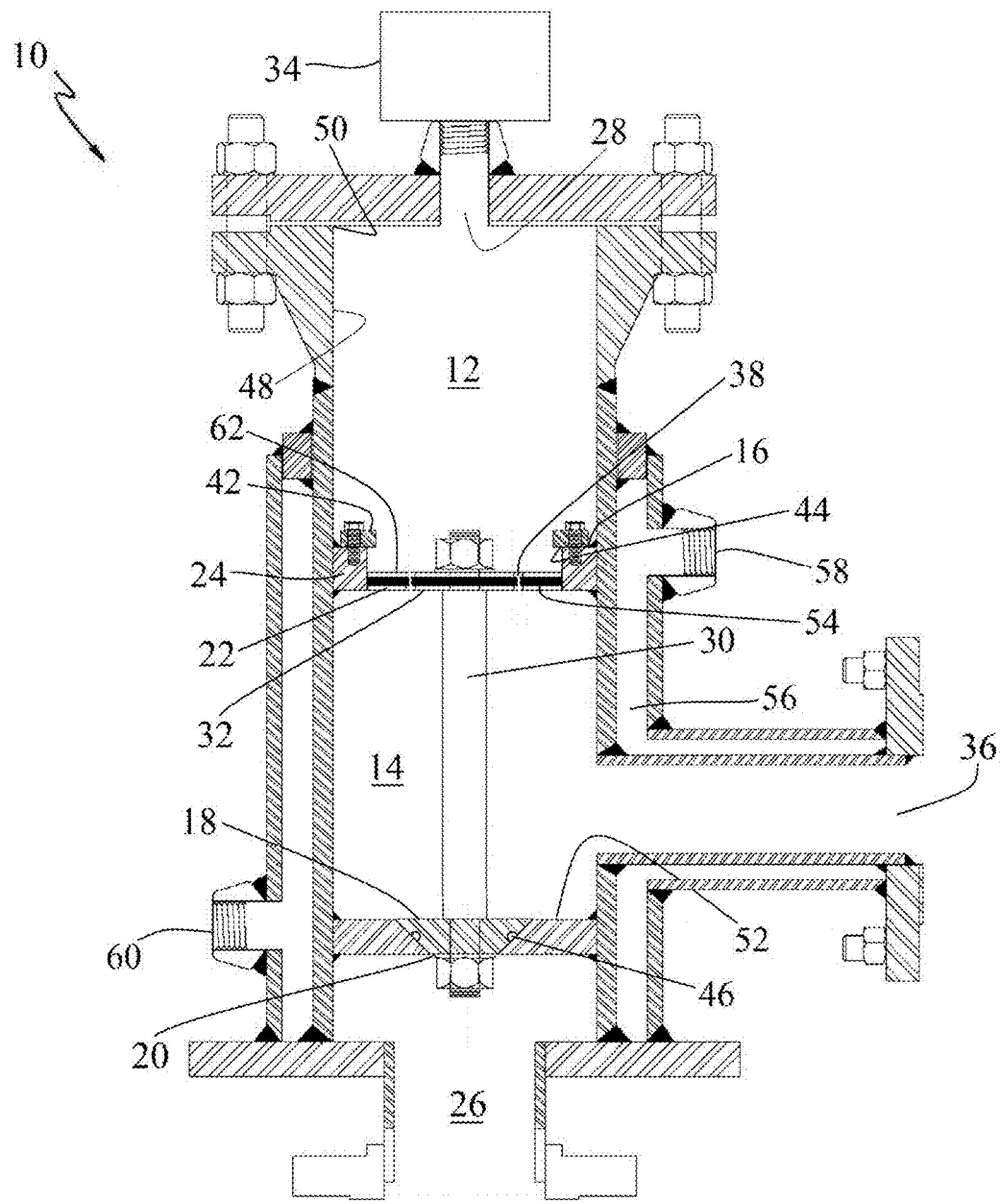
FIG. 1 is a cross-sectional view of an embodiment of a pressure relief system of the present invention with the lower chamber inlet valve closed.

Referring to the attached FIG. 1, an embodiment of a pressure relief system 10 for use in a fluid system, the fluid system including without limitation gas mixtures and liquid-gas mixtures, is depicted. In this embodiment, the pressure relief system 10 includes a sealed upper chamber 12 and a sealed lower chamber 14. A plate 22 is positioned between upper chamber 12 and lower chamber 14. In one embodiment, plate 22 is vertically moveable within a plate support 24. In one embodiment, plate 22 comprises a substantially circular component having a circular edge adapted and configured to at least partially engage plate support 24.

In one embodiment, one or more substantially annular o-rings 54 are disposed circumferentially around the circular edge of plate 22. Plate 22 may comprise a channel (not shown) within its circular edge to accommodate an o-ring 54. As would be understood by one skilled in the art, an o-ring 54 may comprise any suitable material, such as but not limited to, an elastomer. In one embodiment, o-ring 54 comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

Plate support 24 may be provided to ensure a direct up and down movement of plate 22. In one embodiment, plate support 24 comprises a substantially annular component circumferentially disposed within upper chamber 12. Plate support 24 may be affixed to the inner surface 48 of upper chamber 12, or may be provided integral thereto. In one embodiment, plate 22 and plate support 24 divide upper chamber 12 from lower chamber 14.

In one embodiment, one or more upper stops 42 are provided within upper chamber 12 to prevent upward movement of plate 22 there beyond. In the embodiment shown in FIG. 1, upper stop 42 is employed to limit upward movement of plate 22 beyond an upper end 44 of plate support 24. In one embodiment, the total vertical movement of plate 22 is limited by upper stop 42 to about one inch. In one embodiment, upper stop 42 comprises a substantially annular component circumferentially disposed within upper chamber 12 and contacting upper surface 44 of plate support 24. In the embodiment shown in FIG. 1, upper stop 42 is affixed to plate support 24, while in other embodiments (not shown), upper stop 42 is affixed to or integral with inner surface 48 of upper chamber 12.

In one embodiment (not shown), plate 22 is sized and configured to be disposed within upper chamber 12 without need for a plate support 24. In such an embodiment, plate 22 is vertically moveable within upper chamber 12, whereby the interior surface 48 of upper chamber 12 provides support for plate 22. In such an embodiment, one or more upper stops 42 may be provided between the upper surface 62 of plate 22 and the upper end 50 of upper chamber 12. In such an embodiment, one or more upper stops 42, if employed, may be affixed to the interior surface 48 of upper chamber 12 or integral thereto.

In one embodiment, plate 22, in combination with plate support 24, substantially prevents fluid flow between upper chamber 12 and lower chamber 14. In one embodiment, plate 22 comprises one or more orifices (weep holes) 38, which allow for fluid flow between upper chamber 12 and lower chamber 14. The number and dimensions of orifices 38 may be varied to accomplish a determined limitation of flow between upper chamber 12 and lower chamber 14 through plate 22. In one embodiment, the orifices 38 allow a small volume of fluid from fluid pressure source 34 to continuously purge the lower chamber 14.

In one embodiment, lower chamber 14 comprises an inlet opening 20 and an outlet opening 36. An inlet seal 18 is provided in lower chamber 14. Inlet seal 18 is connected to plate 22 by a shaft 30. Shaft 30 may comprise any suitable material, as would be understood by one skilled in the art. In one embodiment, shaft 30 comprises chrome. Although the embodiment shown in FIG. 1 depicts shaft 30 extending through inlet seal 18 and connection of inlet seal 18 to shaft 30 utilizing a threaded connection beneath inlet seal 18, the invention is not so limited and other connection geometries and mechanisms may be employed, as would be understood by one skilled in the art. In one embodiment (not shown), inlet seal 18 may comprise a threaded internal bore which may be utilized to connect a shaft 30 comprising threading external thereto. In another embodiment (not shown), inlet seal 18 may be integral to shaft 30. In addition, although the embodiment shown in FIG. 1 depicts shaft 30 extending through plate 22 and connection of plate 22 to shaft 30 utilizing a threaded connection above plate 22, the invention is not so limited and other connection geometries and mechanisms may be employed, as would be understood by one skilled in the art. In one embodiment (not shown), plate 22 may comprise a threaded internal bore which may be utilized to connect a shaft 30 comprising threading external thereto. In another embodiment (not shown), plate 22 may be integral to shaft 30.

Inlet seal 18, in combination with inlet opening 20, provides an inlet valve adapted to control fluid flow into lower chamber 14 via inlet opening 20. Shaft 30 maintains fixed spacing between upper plate 22 and inlet seal 18. In one embodiment, inlet opening 20 comprises a beveled surface 40. In one embodiment, inlet seal 18 comprises a conically shaped exterior surface adapted to sealingly engage beveled surface 40. Although the embodiment depicted in FIG. 1 comprises an inlet seal 18 configured to fit substantially within inlet opening 20, the invention is not so limited and other geometries may be employed. For example, in one embodiment (not shown), inlet seal 18 may comprise a substantially flat bottom surface having dimensions greater than the cross-sectional area of inlet 20, whereby the bottom surface of inlet seal 18 is configured and adapted to contact the internal bottom surface 52 of lower chamber 14 to seal inlet 20.

In one embodiment, inlet seal 18 comprises one or more o-rings 46 to facilitate provision of a fluid seal between inlet seal 18 and inlet opening 20. In one embodiment, o-ring 46 may be provided at least partially within a channel (not shown) circumferentially disposed on the exterior surface of inlet seal 18. As would be understood by one skilled in the art, an o-ring 46 may comprise any suitable material, such as but not limited to, an elastomer. In one embodiment, o-ring 46 comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

Upper chamber 12 has at least one inlet opening 28. In one embodiment, an inlet opening 28 is connected to a pressure source 34. Pressure source 34 is operable to provide fluid to maintain a predetermined pressure or pressure range within upper chamber 12.

Upper plate 22 has a lower surface 32 exposed to the interior of lower chamber 14. In one embodiment, the surface area of lower surface 32 is greater than the cross-sectional area of lower chamber 14 inlet 20.

Figure 2:
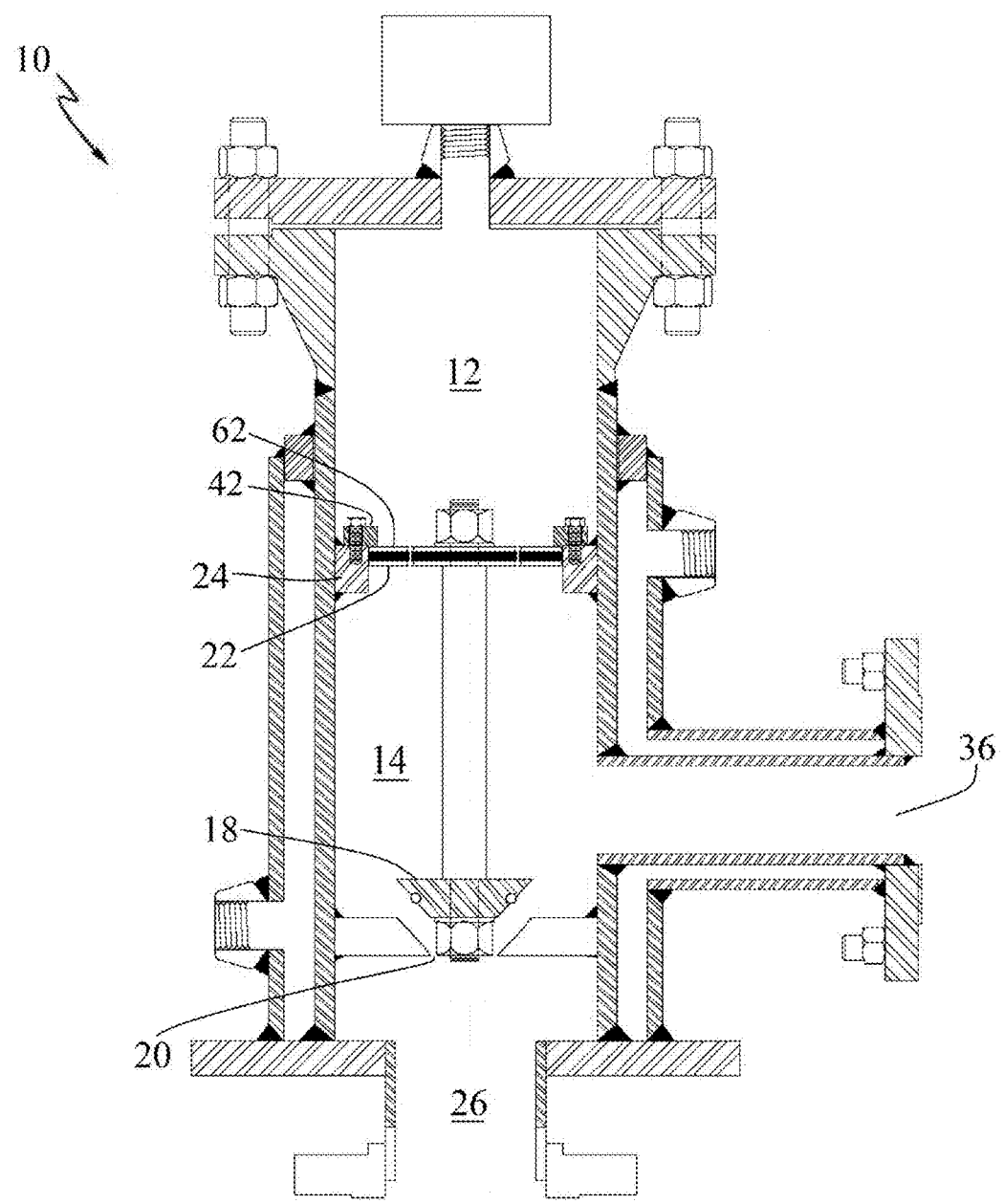
FIG. 2 is a cross-sectional view of an embodiment of a pressure relief system of the present invention with the lower chamber inlet valve open.

In an exemplary embodiment, lower chamber inlet opening 20 is fluidly connected to a process vessel, such as a pipe or chamber 26, containing a fluid (not shown). As upper plate 22 and inlet seal 18 are connected with a fixed distance there between, and the pressure within upper chamber 12 can be controlled, movement of inlet seal 18 may be controlled by controlling pressure within upper chamber 12 in relation to the pressure in pipe/chamber 26. Pressure in upper chamber 12 is controlled to allow pressure release of fluid within pipe/chamber 26 through lower chamber 14 by means of inlet opening 20 and outlet opening 36. Such control is accomplished by providing a desired fluid pressure within upper chamber 12. When fluid pressure within pipe/chamber 26 at inlet opening 20 exceeds a determined level, inlet seal 18 is forced upward, thereby biasing plate 22 upward toward upper end 50 of upper chamber 12, as depicted in FIG. 2. As shown in FIG. 2, upward movement of inlet seal 18 unseals inlet opening 20, thereby allowing fluid from pipe/chamber 26 to flow there through. Fluid entering lower chamber 14 through inlet 20 flows out through outlet 36. Upon diminishment of fluid pressure within pipe/chamber 26 at inlet 20 to a level at or below the determined level, fluid pressure within upper chamber 12 biases plate 22 downward toward lower chamber 14, thereby biasing inlet seal 18 back into sealing engagement with inlet 20.

In one embodiment, pressure relief system 10 comprises a temperature control system comprising a sealed jacket component 56. The temperature control system may be adapted and configured to provide and/or maintain fluid disposed within upper chamber 12, lower chamber 14, and/or pipe/chamber 26 in a liquid or gaseous state. In one aspect, this would include providing/maintaining a low melting temperature material, such as sulfur, in a molten state. In one embodiment, jacket 56 comprises a substantially hollow, sealed component adapted and configured to contain a fluid for heating and/or cooling of at least a portion of upper chamber 12, lower chamber 14, and/or pipe/chamber 26. In one embodiment, jacket 56 is adapted and configured to accommodate fluid flow there through via introduction of the temperature controlling fluid (not shown) into jacket 56 through jacket inlet 58, and outflow of the temperature controlling fluid through outlet 60. In one embodiment, the temperature controlling fluid is low-pressure steam. As one skilled in the art would understand, in an embodiment where low-pressure steam is introduced via jacket inlet 58, the fluid exiting jacket outlet 60 may comprise steam condensate.

Additional components (not shown) may be employed to control, for example, flow rate, temperature, pressure, etc. of the temperature controlling fluid. In the embodiment shown in FIG. 1, jacket 56 is depicted as a single component disposed circumferentially external to portions of upper chamber 12, lower chamber 14, and pipe/chamber 26, although the invention is not so limited and other arrangements are possible. In one embodiment, a plurality of jackets 56 is employed, whereby different components of pressure relief system 10 can be provided/maintained at different temperatures. In other embodiments of the temperature control system, jacket 56 may be replaced with, our augmented by, one or more additional components (not shown), such as steam or impedance heat tracing, or other heating/cooling mechanisms as would be appreciated by one skilled in the art.

Additional embodiments of the present invention are depicted in FIGS. 3, 3A, 4, 4A, 5, 5A, and 6. Therein, components similar and/or identical to those described above with respect to pressure relief system 10 are correspondingly numbered.

Figure 3:
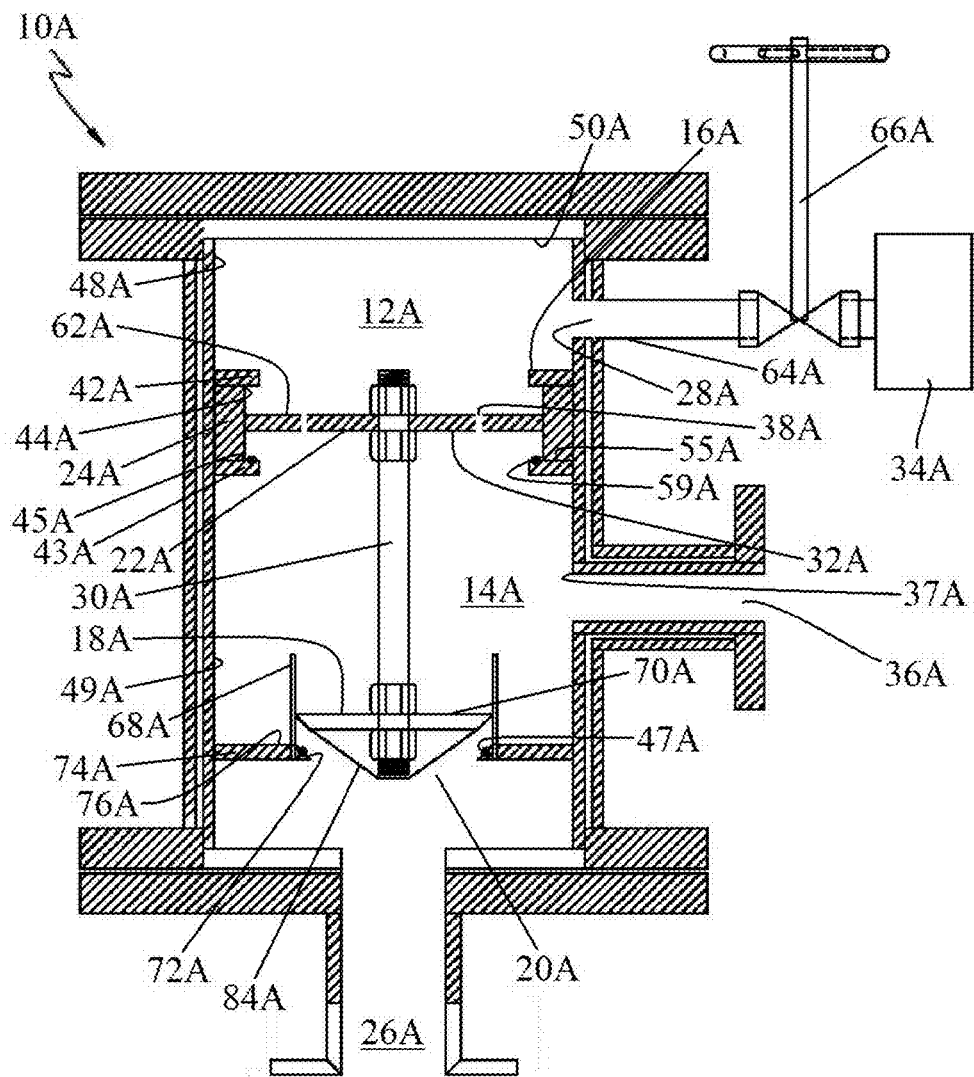
FIG. 3 is a cross-sectional view of another embodiment of a pressure relief system of the present invention.

Referring to FIG. 3, an embodiment of a pressure relief system 10A for use in a fluid system, the fluid system including without limitation gas mixtures and liquid-gas mixtures, is depicted. In this embodiment, the pressure relief system 10A includes a sealed upper chamber 12A and a sealed lower chamber 14A. A plate 22A is positioned between upper chamber 12A and lower chamber 14A. In one embodiment, plate 22A is vertically moveable within a plate support 24A. In one embodiment, plate 22A comprises a substantially circular component having a circular edge adapted and configured to at least partially engage plate support 24A. In one embodiment (not shown), one or more substantially annular o-rings, such as but not limited to, an o-ring similar to o-ring 54 described above with regard to pressure relief system 10 and identified in FIG. 1, are disposed circumferentially around the circular edge of plate 22A.

Plate support 24A may be provided to ensure a direct up and down movement of plate 22A. In one embodiment, plate support 24A comprises a substantially annular component circumferentially disposed within upper chamber 12A. Plate support 24A may be affixed to the inner surface 48A of upper chamber 12A, or may be provided integral thereto. In one embodiment, plate 22A and plate support 24A divide upper chamber 12A from lower chamber 14A.

In one embodiment, one or more upper stops 42A are provided within upper chamber 12A to prevent upward movement of plate 22A there beyond. In the embodiment shown in FIG. 3, upper stop 42A is employed to limit upward movement of plate 22A beyond an upper end 44A of plate support 24A. In one embodiment, one or more lower stops 43A are provided within upper chamber 12A to prevent downward movement of plate 22A there beyond. In the embodiment shown in FIG. 3, lower stop 43A is employed to limit downward movement of plate 22A beyond a lower end 45A of plate support 24A. In one embodiment, the total vertical movement of plate 22A is limited by upper stop 42A and lower stop 43A to about one inch. In one embodiment, upper stop 42A and/or lower stop 43A comprise a substantially annular component circumferentially disposed within upper chamber 12A and contacting upper end 44A of plate support 24A and lower end 45A of plate support 24A, respectively. In the embodiment shown in FIG. 3, upper stop 42A and lower stop 43A are affixed to plate support 24A, while in other embodiments (not shown), upper stop 42A and/or lower stop 43A are affixed to or integral with inner surface 48A of upper chamber 12A.

In one embodiment, one or more substantially annular o-rings 59A are disposed circumferentially around the circular edge of lower stop 43A at least partially protruding from an upper surface 55A thereof. In one embodiment, sealing engagement (not shown) between plate 22A and lower stop 43A comprises contact between a portion of o-ring 59A and a bottom surface 32A of plate 22A. Lower stop 43A may comprise a channel (not shown) proximate its circular edge to accommodate an o-ring 59A. As would be understood by one skilled in the art, an o-ring 59A may comprise any suitable material, such as but not limited to, an elastomer. In one embodiment, o-ring 59A comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment (not shown), plate 22A is sized and configured to be disposed within upper chamber 12A without need for a plate support 24A. In such an embodiment, plate 22A is vertically moveable within upper chamber 12A, whereby the interior surface 48A of upper chamber 12A provides support for plate 22A. In such an embodiment, one or more upper stops 42A may be provided between the upper surface 62A of plate 22A and the lower edge 64A of inlet opening 28A. Additionally, in such an embodiment, one or more lower stops 43A may be provided between the lower surface 32A of plate 22A and the upper edge 37A of outlet opening 36A. Further in such an embodiment, one or more upper stops 42A and/or lower stops 43A, if employed, may be affixed to the interior surface 48A of upper chamber 12A or integral thereto.

In one embodiment, plate 22A, in combination with plate support 24A, substantially prevents fluid flow between upper chamber 12A and lower chamber 14A. In one embodiment, plate 22A comprises one or more orifices (weep holes) 38A, which allow for fluid flow between upper chamber 12A and lower chamber 14A even when plate 22A is sealingly engaged with lower stop 43A. The number and dimensions of orifices 38A may be varied to accomplish a determined limitation of flow between upper chamber 12A and lower chamber 14A through plate 22A. In one embodiment, the orifices 38A allow a small volume of fluid from fluid pressure source 34A to continuously purge the lower chamber 14A.

In one embodiment, lower chamber 14A comprises an inlet opening 20A and an outlet opening 36A. An inlet seal 18A is provided in lower chamber 14A. Inlet seal 18A is connected to plate 22A by a shaft 30A. Shaft 30A may comprise any suitable material, as would be understood by one skilled in the art. In one embodiment, shaft 30A comprises chrome. Although the embodiment shown in FIG. 3 depicts shaft 30A extending partially through inlet seal 18A and connection of inlet seal 18A to shaft 30A utilizing a threaded connection within inlet seal 18A, the invention is not so limited and other connection geometries and mechanisms may be employed, as would be understood by one skilled in the art. In one embodiment (not shown), inlet seal 18A may comprise a threaded internal bore which may be utilized to connect a shaft 30A comprising threading external thereto. In another embodiment (not shown), inlet seal 18A may be integral to shaft 30A. In addition, although the embodiment shown in FIG. 3 depicts shaft 30A extending through plate 22A and connection of plate 22A to shaft 30A utilizing a threaded connection above and below plate 22A, the invention is not so limited and other connection geometries and mechanisms may be employed, as would be understood by one skilled in the art. In one embodiment (not shown), plate 22A may comprise a threaded internal bore which may be utilized to connect a shaft 30A comprising threading external thereto. In another embodiment (not shown), plate 22A may be integral to shaft 30A.

In one embodiment, a lower end of lower chamber 14A is partially bounded by an inlet opening plate 74A. In one embodiment, inlet opening plate 74A comprises an inlet opening edge 72A comprising a beveled surface. In one embodiment, inlet opening plate 74A is affixed (removably or irremovably) to inner surface 49A of lower chamber 14A. In one embodiment, such affixation comprises welding and/or bolting of inlet opening plate 74A to inner surface 49A. In one embodiment, inlet opening plate 74A is provided integral to inner surface 49A. Inlet seal 18A, in combination with inlet opening plate 74A, provides an inlet valve adapted to control fluid flow from into lower chamber 14A via inlet opening 20A. Shaft 30A maintains fixed spacing between upper plate 22A and inlet seal 18A. In one embodiment, inlet seal 18A comprises a conically shaped exterior bottom surface 84A, although other geometries may be employed.

In one embodiment, inlet opening edge 72A comprises one or more o-rings 47A at least partially protruding from the surface thereof to facilitate provision of a fluid seal between inlet seal 18A and inlet opening plate 74A. In one embodiment, sealing engagement between inlet seal 18A and inlet opening plate 74A comprises contact between a portion of o-ring 47A and a bottom surface 84A of inlet seal 18A. In one embodiment, o-ring 47A may be provided at least partially within a channel (not shown) circumferentially disposed on the beveled surface of inlet opening edge 72A. As would be understood by one skilled in the art, an o-ring 47A may comprise any suitable material, such as but not limited to, an elastomer. In one embodiment, o-ring 47A comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment, pressure relief system 10A comprises one or more guide pins 68A. In one embodiment, a guide pin 68A comprises a substantially vertically oriented elongated member that extends upward from inlet opening plate 74A. In one embodiment, a plurality of guide pins 68A is disposed about inlet opening 20A such that upward movement of inlet seal 18A is confined thereby. In one embodiment, at least four guide pins 68A are provided. One or more guide pins 68A may be affixed to inlet opening plate 74A or integral therewith. In one embodiment, a substantially annular structure (not shown), such as, but not limited to, a pipe or tube section, may be provided extending upward from inlet opening plate 74A around inlet opening 20A, such that upward movement of inlet seal 18A is confined thereby. Such an annular structure (not shown) may comprise a single component (comprising, for example, perforated pipe having one or more orifices extending transversely there through) or a plurality of components wherein, for example, gaps are provided there between.

Upper chamber 12A has at least one inlet opening 28A. Although inlet opening 28A is depicted in FIG. 3 as being disposed along a side wall (not separately labeled) of upper chamber 12A, the invention is not so limited and an inlet opening 28A may be disposed in upper end 50A of upper chamber 12A, similar to the orientation depicted in FIGS. 1 and 2. In one embodiment, inlet opening 28A is connected to a pressure source 34A. Pressure source 34A is operable to provide fluid to maintain a predetermined pressure or pressure range within upper chamber 12A. In one embodiment, one or more valves 66A may be provided to control fluid flow between pressure source 34A and upper chamber 12A.

Upper plate 22A has a lower surface 32A exposed to the interior of lower chamber 14A. In one embodiment, the surface area of lower surface 32A is greater than the cross-sectional area of lower chamber 14A inlet 20A.

In an exemplary embodiment, lower chamber inlet opening 20A is fluidly connected to a process vessel, such as pipe or chamber 26A, containing a fluid (not shown). As upper plate 22A and inlet seal 18A are connected with a fixed distance there between, and the pressure within upper chamber 12A can be controlled, movement of inlet seal 18A may be controlled by controlling pressure within upper chamber 12A in relation to the pressure in pipe/chamber 26A. Pressure in upper chamber 12A is controlled to allow pressure release of fluid within pipe/chamber 26A through lower chamber 14A by means of inlet opening 20A and outlet opening 36A. Such control is accomplished by providing a desired fluid pressure within upper chamber 12A. When fluid pressure within pipe/chamber 26A at inlet opening 20A exceeds a determined level, inlet seal 18A is forced upward, thereby biasing plate 22A upward toward upper end 50A of upper chamber 12A, as depicted in FIG. 3. As shown in FIG. 3, upward movement of inlet seal 18A allows fluid from pipe/chamber 26A to flow through inlet opening 20A. Fluid entering lower chamber 14A through inlet 20A flows out through outlet 36A. Upon diminishment of fluid pressure within pipe/chamber 26A at inlet opening 20A to a level at or below the determined level, fluid pressure within upper chamber 12A biases plate 22A downward toward lower chamber 14A, thereby biasing inlet seal 18A back into sealing engagement with inlet opening plate 74A.

In one embodiment (not shown), pressure relief system 10A comprises a temperature control system comprising a sealed jacket similar to component 56 depicted in FIGS. 1 and 2. The temperature control system (not shown) may be adapted and configured to provide and/or maintain fluid disposed within upper chamber 12A, lower chamber 14A, and/or pipe/chamber 26A in a liquid or gaseous state. In one aspect, this would include providing/maintaining a low melting temperature material, such as sulfur, in a molten state. In one embodiment, such a temperature control system (not shown) comprises each of the features and capabilities as described above with regard to pressure relief system 10. Other embodiments of a temperature control system (not shown) may comprise steam or impedance heat tracing, or other heating/cooling mechanisms as would be appreciated by one skilled in the art.

Figure 3A:
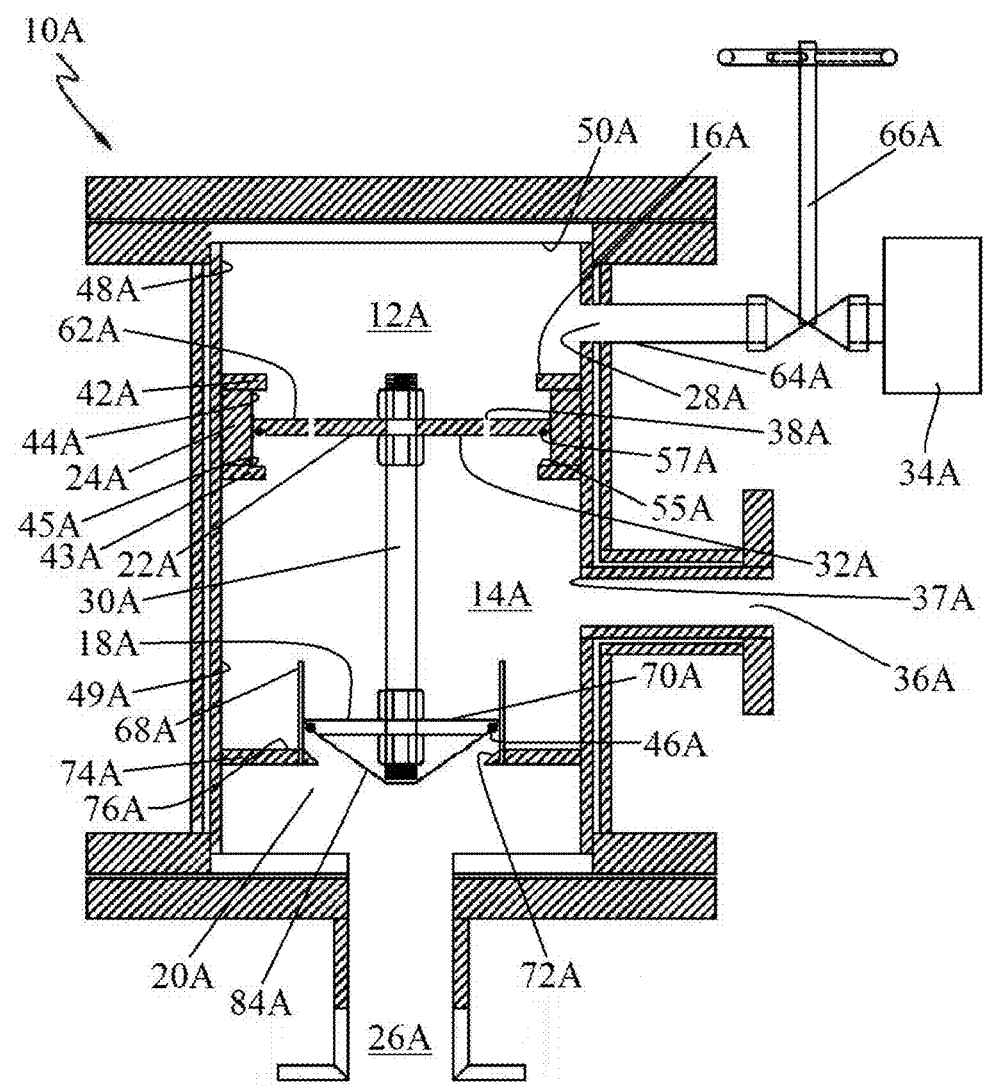
FIG. 3A is a cross-sectional view of another embodiment of a pressure relief system of the present invention.

Another embodiment of pressure relief system 10A is depicted in FIG. 3A, wherein, sealing between plate 22A and lower stop 43A is accomplished utilizing a circumferentially disposed o-ring 57A at least partially protruding from lower surface 32A of plate 22A, wherein sealing comprises contact between a portion of o-ring 57A and upper surface 55A of lower stop 43A. In one embodiment, o-ring 57A may be provided at least partially within a channel (not shown) circumferentially disposed on plate 22A lower surface 32A. As would be understood by one skilled in the art, an o-ring 57A may comprise any suitable material, such as but not limited to, an elastomer. In one embodiment, o-ring 57A comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In the embodiment of pressure relief system 10A shown in FIG. 3A, sealing between inlet seal 18A and inlet opening plate 74A is accomplished utilizing a circumferentially disposed o-ring 46A at least partially protruding from lower surface 84A of inlet seal 18A, wherein sealing comprises contact between a portion of o-ring 46A and an a beveled surface of inlet opening edge 72A of inlet opening plate 74A. In one embodiment, o-ring 46A may be provided at least partially within a channel (not shown) circumferentially disposed on inlet seal 18A lower surface 84A. As would be understood by one skilled in the art, an o-ring 46A may comprise any suitable material, such as but not limited to, an elastomer. In one embodiment, o-ring 46A comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In other embodiments of a pressure relief system 10A (not shown), various combinations of the plate 22A sealing means depicted in FIGS. 3 and 3A, and the inlet seal 18A sealing means depicted in FIGS. 3 and 3A, may be employed as would be understood by one skilled in the art.

Figure 4:
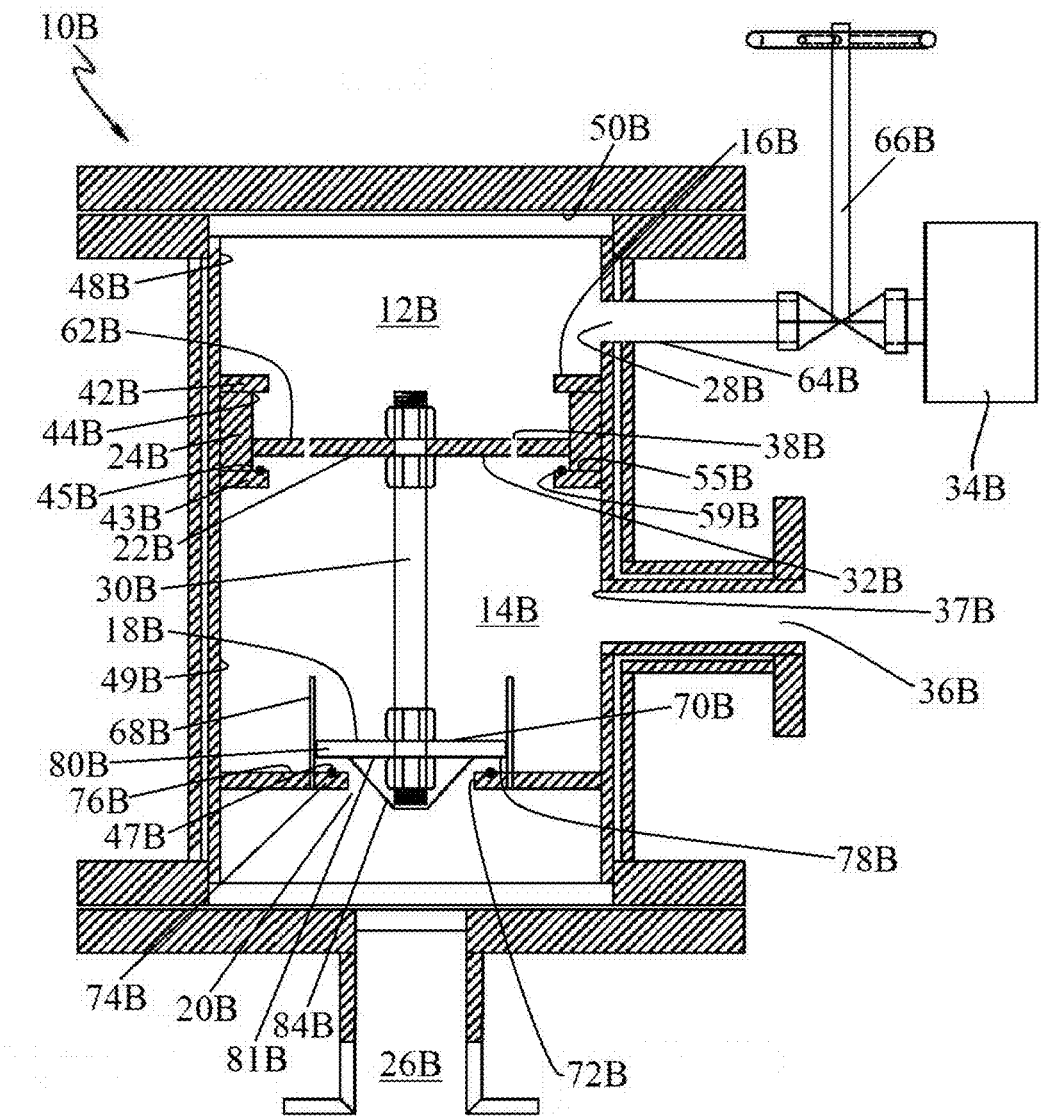
FIG. 4 is a cross-sectional view of another embodiment of a pressure relief system of the present invention.

Referring now to FIG. 4, an embodiment of a pressure relief system 10B for use in a fluid system, the fluid system including without limitation gas mixtures and liquid-gas mixtures, is depicted. In this embodiment, the pressure relief system 10B includes a sealed upper chamber 12B and a sealed lower chamber 14B. A plate 22B is positioned between upper chamber 12B and lower chamber 14B. In one embodiment, plate 22B is vertically moveable within a plate support 24B. In one embodiment, plate 22B comprises a substantially circular component having a circular edge adapted and configured to at least partially engage plate support 24B. In one embodiment (not shown), one or more substantially annular o-rings, such as but not limited to, an o-ring similar to o-ring 54 described above with regard to pressure relief system 10 and identified in FIG. 1, are disposed circumferentially around the circular edge of plate 22B.

Plate support 24B may be provided to ensure a direct up and down movement of plate 22B. In one embodiment, plate support 24B comprises a substantially annular component circumferentially disposed within upper chamber 12B. Plate support 24B may be affixed to the inner surface 48B of upper chamber 12B, or may be provided integral thereto. In one embodiment, plate 22B and plate support 24B divide upper chamber 12B from lower chamber 14B.

In one embodiment, one or more upper stops 42B are provided within upper chamber 12B to prevent upward movement of plate 22B there beyond. In the embodiment shown in FIG. 4, upper stop 42B is employed to limit upward movement of plate 22B beyond an upper end 44B of plate support 24B. In one embodiment, one or more lower stops 43B are provided within upper chamber 12B to prevent downward movement of plate 22B there beyond. In the embodiment shown in FIG. 4, lower stop 43B is employed to limit downward movement of plate 22B beyond a lower end 45B of plate support 24B. In one embodiment, the total vertical movement of plate 22B is limited by upper stop 42B and lower stop 43B to about one inch. In one embodiment, upper stop 42B and/or lower stop 43B comprise a substantially annular component circumferentially disposed within upper chamber 12B and contacting upper end 44B of plate support 24B and lower end 45B of plate support 24B, respectively. In the embodiment shown in FIG. 4, upper stop 42B and lower stop 43B are affixed to plate support 24B, while in other embodiments (not shown), upper stop 42B and/or lower stop 43B are affixed to or integral with inner surface 48B of upper chamber 12B.

In one embodiment, one or more substantially annular o-rings 59B are disposed circumferentially around the circular edge of lower stop 43B at least partially protruding from an upper surface 55B thereof. In one embodiment, sealing engagement (not shown) between plate 22B and lower stop 43B comprises contact between a portion of o-ring 59B and a bottom surface 32B of plate 22B. Lower stop 43B may comprise a channel (not shown) proximate its circular edge to accommodate an o-ring 59B. As would be understood by one skilled in the art, an o-ring 59B may comprise any suitable material, such as but not limited to, an elastomer. In one embodiment, o-ring 59B comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment (not shown), plate 22B is sized and configured to be disposed within upper chamber 12B without need for a plate support 24B. In such an embodiment, plate 22B is vertically moveable within upper chamber 12B, whereby the interior surface 48B of upper chamber 12B provides support for plate 22B. In such an embodiment, one or more upper stops 42B may be provided between the upper surface 62B of plate 22B and the lower edge 64B of inlet opening 28B. Additionally, in such an embodiment, one or more lower stops 43B may be provided between the lower surface 32B of plate 22B and the upper edge 37B of outlet opening 36B. Further in such an embodiment, one or more upper stops 42B and/or lower stops 43B, if employed, may be affixed to the interior surface 48B of upper chamber 12B or integral thereto.

In one embodiment, plate 22B, in combination with plate support 24B, substantially prevents fluid flow between upper chamber 12B and lower chamber 14B. In one embodiment, plate 22B comprises one or more orifices (weep holes) 38B, which allow for fluid flow between upper chamber 12B and lower chamber 14B even when plate 22B is sealingly engaged with lower stop 43B. The number and dimensions of orifices 38B may be varied to accomplish a determined limitation of flow between upper chamber 12B and lower chamber 14B through plate 22B. In one embodiment, the orifices 38B allow a small volume of fluid from fluid pressure source 34B to continuously purge the lower chamber 14B.

In one embodiment, lower chamber 14B comprises an inlet opening 20B and an outlet opening 36B. An inlet seal 18B is provided in lower chamber 14B. Inlet seal 18B is connected to plate 22B by a shaft 30B. Shaft 30B may comprise any suitable material, as would be understood by one skilled in the art. In one embodiment, shaft 30B comprises chrome. Although the embodiment shown in FIG. 4 depicts shaft 30B extending partially through inlet seal 18B and connection of inlet seal 18B to shaft 30B utilizing a threaded connection within inlet seal 18B, the invention is not so limited and other connection geometries and mechanisms may be employed, as would be understood by one skilled in the art. In one embodiment (not shown), inlet seal 18B may comprise a threaded internal bore which may be utilized to connect a shaft 30B comprising threading external thereto. In another embodiment (not shown), inlet seal 18B may be integral to shaft 30B. In addition, although the embodiment shown in FIG. 4 depicts shaft 30B extending through plate 22B and connection of plate 22B to shaft 30B utilizing a threaded connection above and below plate 22B, the invention is not so limited and other connection geometries and mechanisms may be employed, as would be understood by one skilled in the art. In one embodiment (not shown), plate 22B may comprise a threaded internal bore which may be utilized to connect a shaft 30B comprising threading external thereto. In another embodiment (not shown), plate 22B may be integral to shaft 30B.

In one embodiment, a lower end of lower chamber 14B is partially bounded by inlet opening plate 74B. In one embodiment, inlet opening plate 74B comprises an inlet opening edge 72B. In one embodiment (not shown), inlet opening edge 72B comprises a beveled surface. In one embodiment, inlet opening plate 74B is affixed (removably or irremovably) to inner surface 49B of lower chamber 14B. In one embodiment, such affixation comprises welding and/or bolting of inlet opening plate 74B to inner surface 49B. In one embodiment, inlet opening plate 74B is provided integral to inner surface 49B. In the embodiment shown in FIG. 4, inlet seal 18B comprises an inlet seal flange 80B. Inlet seal 18B, in combination with inlet opening plate 74B, provides an inlet valve adapted to control fluid flow from into lower chamber 14B via inlet opening 20B. Shaft 30B maintains fixed spacing between upper plate 22B and inlet seal 18B. In one embodiment, inlet seal 18B comprises a conically shaped exterior bottom surface 84B, although other geometries may be employed.

In one embodiment, inlet opening plate 74B comprises one or more o-rings 47B at least partially protruding from an upper surface 76B thereof to facilitate provision of a fluid seal between inlet seal 18B and inlet opening plate 74B. In one embodiment, sealing engagement between inlet seal 18B and inlet opening plate 74B comprises contact between a portion of o-ring 47B and a bottom surface 81B of inlet seal flange 80B. In one embodiment, o-ring 47B may be provided at least partially within a channel (not shown) circumferentially disposed on inlet opening plate 74B upper surface 76B. As would be understood by one skilled in the art, an o-ring 47B may comprise any suitable material, such as but not limited to, an elastomer. In one embodiment, o-ring 47B comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment, pressure relief system 10B comprises one or more guide pins 68B. In one embodiment, a guide pin 68B comprises a substantially vertically oriented elongated member that extends upward from upper surface 76B of inlet opening plate 74B. In one embodiment, a plurality of guide pins 68B is disposed about inlet opening 20B such that upward movement of inlet seal 18B is confined thereby. In one embodiment, at least four guide pins 68B are provided. One or more guide pins 68B may be affixed to inlet opening plate 74B or integral therewith. In one embodiment, a substantially annular structure (not shown), such as, but not limited to, a pipe or tube section, may be provided extending upward from inlet opening plate 74B around inlet opening 20B, such that upward movement of inlet seal 18B is confined thereby. Such an annular structure (not shown) may comprise a single component (comprising, for example, perforated pipe having one or more orifices extending transversely there through) or a plurality of components wherein, for example, gaps are provided there between.

Upper chamber 12B has at least one inlet opening 28B. Although inlet opening 28B is depicted in FIG. 4 as being disposed along a side wall (not separately labeled) of upper chamber 12B, the invention is not so limited and an inlet opening 28B may be disposed in upper end 50B of upper chamber 12B, similar to the orientation depicted in FIGS. 1 and 2. In one embodiment, inlet opening 28B is connected to a pressure source 34B. Pressure source 34B is operable to provide fluid to maintain a predetermined pressure or pressure range within upper chamber 12B. In one embodiment, one or more valves 66B may be provided to control fluid flow between pressure source 34B and upper chamber 12B.

Upper plate 22B has a lower surface 32B exposed to the interior of lower chamber 14B. In one embodiment, the surface area of lower surface 32B is greater than the cross-sectional area of lower chamber 14B inlet 20B.

In an exemplary embodiment, lower chamber inlet opening 20B is fluidly connected to a process vessel, such as pipe or chamber 26B, containing a fluid (not shown). As upper plate 22B and inlet seal 18B are connected with a fixed distance there between, and the pressure within upper chamber 12B can be controlled, movement of inlet seal 18B may be controlled by controlling pressure within upper chamber 12B in relation to the pressure in pipe/chamber 26B. Pressure in upper chamber 12B is controlled to allow pressure release of fluid within pipe/chamber 26B through lower chamber 14B by means of inlet opening 20B and outlet opening 36B. Such control is accomplished by providing a desired fluid pressure within upper chamber 12B. When fluid pressure within pipe/chamber 26B at inlet opening 20B exceeds a determined level, inlet seal 18B is forced upward, thereby biasing plate 22B upward toward upper end 50B of upper chamber 12B, as depicted in FIG. 4. As shown in FIG. 4, upward movement of inlet seal 18B allows fluid from pipe/chamber 26B to flow through inlet opening 20B. Fluid entering lower chamber 14B through inlet 20B flows out through outlet 36B. Upon diminishment of fluid pressure within pipe/chamber 26B at inlet opening 20B to a level at or below the determined level, fluid pressure within upper chamber 12B biases plate 22B downward toward lower chamber 14B, thereby biasing inlet seal 18B back into sealing engagement with inlet opening plate 74B.

In one embodiment (not shown), pressure relief system 10B comprises a temperature control system comprising a sealed jacket similar to component 56 depicted in FIGS. 1 and 2. The temperature control system (not shown) may be adapted and configured to provide and/or maintain fluid disposed within upper chamber 12B, lower chamber 14B, and/or pipe/chamber 26B in a liquid or gaseous state. In one aspect, this would include providing/maintaining a low melting temperature material, such as sulfur, in a molten state. In one embodiment, such a temperature control system (not shown) comprises each of the features and capabilities as described above with regard to pressure relief system 10. Other embodiments of a temperature control system (not shown) may comprise steam or impedance heat tracing, or other heating/cooling mechanisms as would be appreciated by one skilled in the art.

Figure 4A:
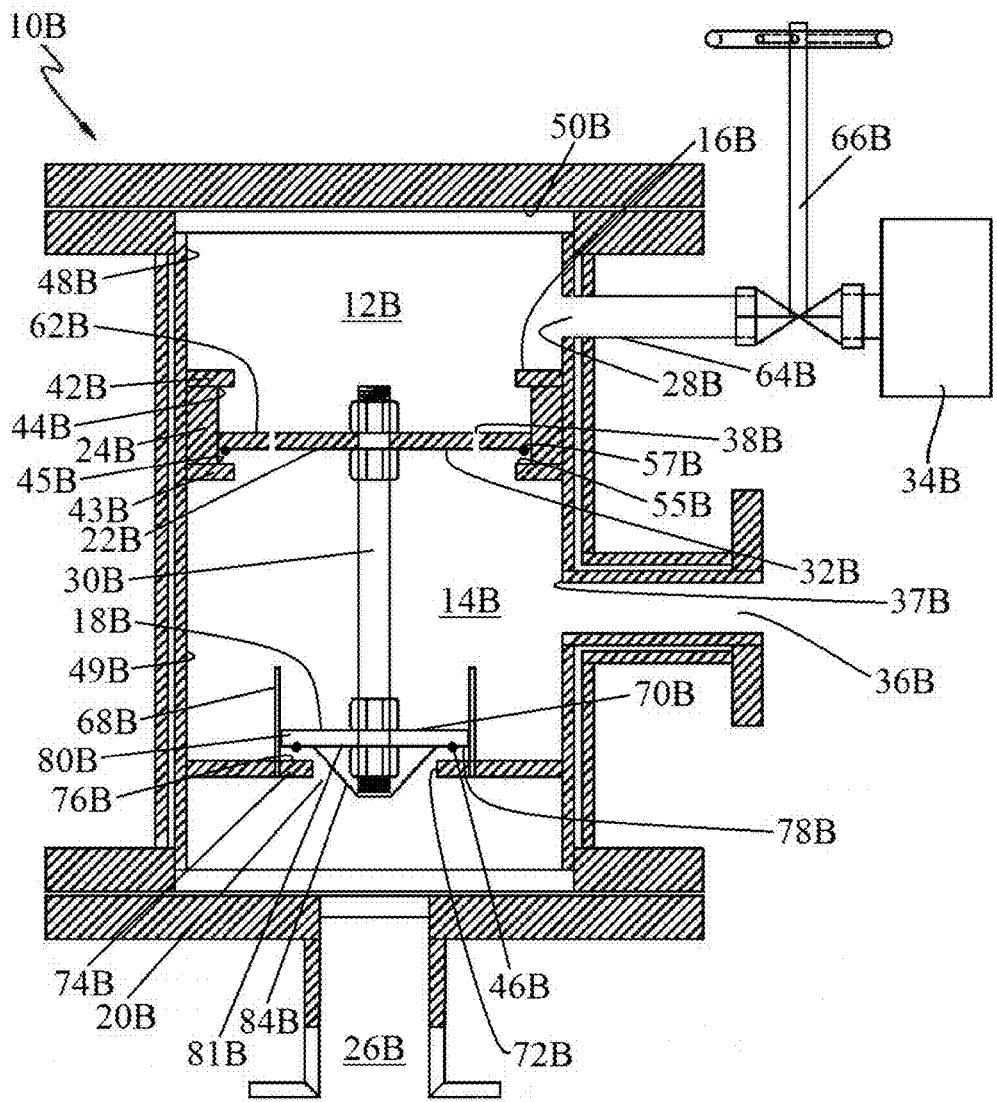
FIG. 4A is a cross-sectional view of another embodiment of a pressure relief system of the present invention.

Another embodiment of pressure relief system 10B is depicted in FIG. 4A, wherein, sealing between plate 22B and lower stop 43B is accomplished utilizing a circumferentially disposed o-ring 57B at least partially protruding from lower surface 32B of plate 22B, wherein sealing comprises contact between a portion of o-ring 57B and upper surface 55B of lower stop 43B. In one embodiment, o-ring 57B may be provided at least partially within a channel (not shown) circumferentially disposed on plate 22B lower surface 32B. As would be understood by one skilled in the art, an o-ring 57B may comprise any suitable material, such as but not limited to, an elastomer. In one embodiment, o-ring 57B comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In the embodiment of pressure relief system 10B shown in FIG. 4A, sealing between inlet seal 18B and inlet opening plate 74B is accomplished utilizing a circumferentially disposed o-ring 46B at least partially protruding from lower surface 81B of inlet seal flange 80B, wherein sealing comprises contact between a portion of o-ring 46B and upper surface 76B of inlet opening plate 74B. In one embodiment, o-ring 46B may be provided at least partially within a channel (not shown) circumferentially disposed on inlet seal flange 80B lower surface 81B. As would be understood by one skilled in the art, an o-ring 46B may comprise any suitable material, such as but not limited to, an elastomer. In one embodiment, o-ring 46B comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In other embodiments of a pressure relief system 10B (not shown), various combinations of the plate 22B sealing means depicted in FIGS. 4 and 4A, and the inlet seal 18B sealing means depicted in FIGS. 4 and 4A, may be employed as would be understood by one skilled in the art.

Figure 5:
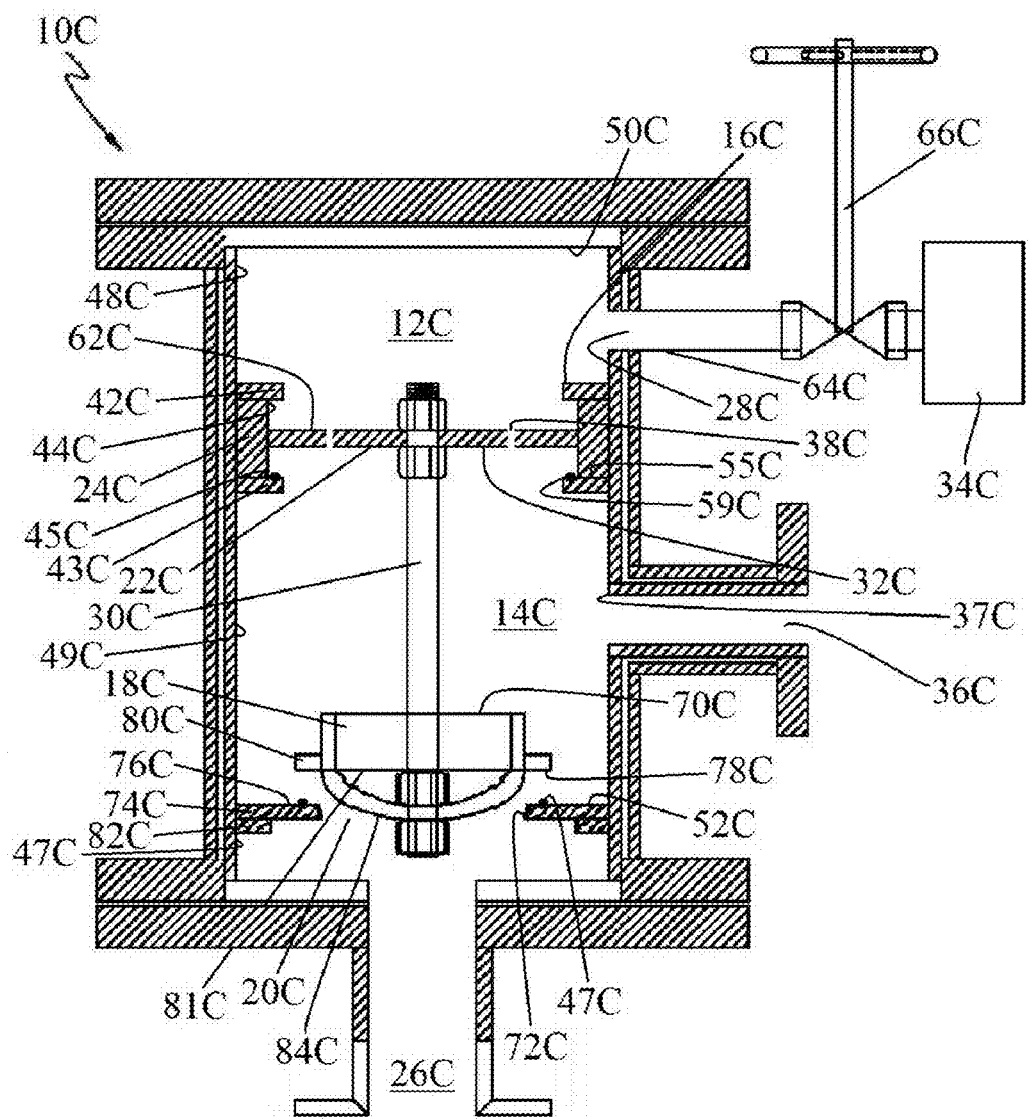
FIG. 5 is a cross-sectional view of another embodiment of a pressure relief system of the present invention.

Referring to FIG. 5, an embodiment of a pressure relief system 10C for use in a fluid system, the fluid system including without limitation gas mixtures and liquid-gas mixtures, is depicted. In this embodiment, the pressure relief system 10C includes a sealed upper chamber 12C and a sealed lower chamber 14C. A plate 22C is positioned between upper chamber 12C and lower chamber 14C. In one embodiment, plate 22C is vertically moveable within a plate support 24C. In one embodiment, plate 22C comprises a substantially circular component having a circular edge adapted and configured to at least partially engage plate support 24C. In one embodiment (not shown), one or more substantially annular o-rings, such as but not limited to, an o-ring similar to o-ring 54 described above with regard to pressure relief system 10 and identified in FIG. 1, are disposed circumferentially around the circular edge of plate 22C.

Plate support 24C may be provided to ensure a direct up and down movement of plate 22C. In one embodiment, plate support 24C comprises a substantially annular component circumferentially disposed within upper chamber 12C. Plate support 24C may be affixed to the inner surface 48C of upper chamber 12C, or may be provided integral thereto. In one embodiment, plate 22C and plate support 24C divide upper chamber 12C from lower chamber 14C.

In one embodiment, one or more upper stops 42C are provided within upper chamber 12C to prevent upward movement of plate 22C there beyond. In the embodiment shown in FIG. 5, upper stop 42C is employed to limit upward movement of plate 22C beyond an upper end 44C of plate support 24C. In one embodiment, one or more lower stops 43C are provided within upper chamber 12C to prevent downward movement of plate 22C there beyond. In the embodiment shown in FIG. 5, lower stop 43C is employed to limit downward movement of plate 22C beyond a lower end 45C of plate support 24C. In one embodiment, the total vertical movement of plate 22C is limited by upper stop 42C and lower stop 43C to about one inch. In one embodiment, upper stop 42C and/or lower stop 43C comprise a substantially annular component circumferentially disposed within upper chamber 12C and contacting upper end 44C of plate support 24C and lower end 45C of plate support 24C, respectively. In the embodiment shown in FIG. 5, upper stop 42C and lower stop 43C are affixed to plate support 24C, while in other embodiments (not shown), upper stop 42C and/or lower stop 43C are affixed to or integral with inner surface 48C of upper chamber 12C.

In one embodiment, one or more substantially annular o-rings 59C are disposed circumferentially around the circular edge of lower stop 43C at least partially protruding from an upper surface 55C thereof. In one embodiment, sealing engagement (not shown) between plate 22C and lower stop 43C comprises contact between a portion of o-ring 59C and a bottom surface 32C of plate 22C. Lower stop 43C may comprise a channel (not shown) proximate its circular edge to accommodate an o-ring 59C. As would be understood by one skilled in the art, an o-ring 59C may comprise any suitable material, such as but not limited to, an elastomer. In one embodiment, o-ring 59C comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment (not shown), plate 22C is sized and configured to be disposed within upper chamber 12C without need for a plate support 24C. In such an embodiment, plate 22C is vertically moveable within upper chamber 12C, whereby the interior surface 48C of upper chamber 12C provides support for plate 22C. In such an embodiment, one or more upper stops 42C may be provided between the upper surface 62C of plate 22C and the lower edge 64C of inlet opening 28C. Additionally, in such an embodiment, one or more lower stops 43C may be provided between the lower surface 32C of plate 22C and the upper edge 37C of outlet opening 36C. Further in such an embodiment, one or more upper stops 42C and/or lower stops 43C, if employed, may be affixed to the interior surface 48C of upper chamber 12C or integral thereto.

In one embodiment, plate 22C, in combination with plate support 24C, substantially prevents fluid flow between upper chamber 12C and lower chamber 14C. In one embodiment, plate 22C comprises one or more orifices (weep holes) 38C, which allow for fluid flow between upper chamber 12C and lower chamber 14C even when plate 22C is sealingly engaged with lower stop 43C. The number and dimensions of orifices 38C may be varied to accomplish a determined limitation of flow between upper chamber 12C and lower chamber 14C through plate 22C. In one embodiment, the orifices 38C allow a small volume of fluid from fluid pressure source 34C to continuously purge the lower chamber 14C.

In one embodiment, lower chamber 14C comprises an inlet opening 20C and an outlet opening 36C. An inlet seal 18C is provided in lower chamber 14C. Inlet seal 18C is connected to plate 22C by a shaft 30C. Shaft 30C may comprise any suitable material, as would be understood by one skilled in the art. In one embodiment, shaft 30C comprises chrome. Although the embodiment shown in FIG. 5 depicts shaft 30C extending through inlet seal 18C and connection of inlet seal 18C to shaft 30C utilizing a threaded connection within inlet seal 18C, the invention is not so limited and other connection geometries and mechanisms may be employed, as would be understood by one skilled in the art. In one embodiment (not shown), inlet seal 18C may comprise a threaded internal bore which may be utilized to connect a shaft 30C comprising threading external thereto. In another embodiment (not shown), inlet seal 18C may be integral to shaft 30C. In addition, although the embodiment shown in FIG. 5 depicts shaft 30C extending through plate 22C and connection of plate 22C to shaft 30C utilizing a threaded connection above and below plate 22C, the invention is not so limited and other connection geometries and mechanisms may be employed, as would be understood by one skilled in the art. In one embodiment (not shown), plate 22C may comprise a threaded internal bore which may be utilized to connect a shaft 30C comprising threading external thereto. In another embodiment (not shown), plate 22C may be integral to shaft 30C.

In one embodiment, a lower end of lower chamber 14C is partially bounded by inlet opening plate 74C. In one embodiment, inlet opening plate 74C comprises an inlet opening edge 72C. In one embodiment (not shown), inlet opening edge 72C comprises a beveled surface. In one embodiment, inlet opening plate 74C is affixed (removably or irremovably) to inner surface 49C of lower chamber 14C. In one embodiment, such affixation comprises welding and/or bolting of inlet opening plate 74C to inner surface 49C. In one embodiment, inlet opening plate 74C is provided integral to inner surface 49C. In one embodiment, one or more plate supports 82C are provided beneath inlet opening plate 74C to structurally support inlet opening plate 74C. In one embodiment, a plate support 82C is affixed to or integral with inner surface 47C of pipe/chamber 26. In one embodiment, such affixation comprises welding and/or bolting of plate support 82C to inner surface 47C. In one embodiment, a plate support 82C extends circumferentially around pipe/chamber 26C, although the invention is not so limited and one or more plate supports 82C may extend only partially around pipe/chamber 26C. In the embodiment shown in FIG. 5, inlet seal 18C comprises an inlet seal flange 80C. Inlet seal 18C, in combination with inlet opening plate 74C, provides an inlet valve adapted to control fluid flow from into lower chamber 14C via inlet opening 20C. Shaft 30C maintains fixed spacing between upper plate 22C and inlet seal 18C. In one embodiment, inlet seal 18C comprises a rounded shaped exterior bottom surface 84C, although other geometries may be employed. In one embodiment, a rounded shaped exterior bottom surface 84C comprises a 2:1 semi-elliptical geometry.

In one embodiment, inlet opening plate 74C comprises one or more o-rings 47C at least partially protruding from an upper surface 76C thereof to facilitate provision of a fluid seal between inlet seal 18C and inlet opening plate 74C. In one embodiment, sealing engagement between inlet seal 18C and inlet opening plate 74C comprises contact between a portion of o-ring 47C and a bottom surface 81C of inlet seal flange 80C. In one embodiment, o-ring 47C may be provided at least partially within a channel (not shown) circumferentially disposed on inlet opening plate 74C upper surface 76C. As would be understood by one skilled in the art, an o-ring 47C may comprise any suitable material, such as but not limited to, an elastomer. In one embodiment, o-ring 47C comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In one embodiment, pressure relief system 10C comprises one or more guide pins (not shown) substantially structurally and functionally similar to guide pins 68A and 68B described above regarding, and depicted in, FIGS. 3, 3A, and FIGS. 4, 4A, respectively. In one embodiment, pressure relief system 10C comprises a substantially annular structure (not shown), such as, but not limited to, a pipe or tube section, extending upward from inlet opening plate 74C around inlet opening 20C, such that upward movement of inlet seal 18C is confined thereby. Such an annular structure (not shown) may comprise a single component (comprising, for example, perforated pipe having one or more orifices extending transversely there through) or a plurality of components wherein, for example, gaps are provided there between.

Upper chamber 12C has at least one inlet opening 28C. Although inlet opening 28C is depicted in FIG. 5 as being disposed along a side wall (not separately labeled) of upper chamber 12C, the invention is not so limited and an inlet opening 28C may be disposed in upper end 50C of upper chamber 12C, similar to the orientation depicted in FIGS. 1 and 2. In one embodiment, inlet opening 28C is connected to a pressure source 34C. Pressure source 34C is operable to provide fluid to maintain a predetermined pressure or pressure range within upper chamber 12C. In one embodiment, one or more valves 66C may be provided to control fluid flow between pressure source 34C and upper chamber 12C.

Upper plate 22C has a lower surface 32C exposed to the interior of lower chamber 14C. In one embodiment, the surface area of lower surface 32C is greater than the cross-sectional area of lower chamber 14C inlet 20C.

In an exemplary embodiment, lower chamber inlet opening 20C is fluidly connected to a process vessel, such as pipe or chamber 26C, containing a fluid (not shown). As upper plate 22C and inlet seal 18C are connected with a fixed distance there between, and the pressure within upper chamber 12C can be controlled, movement of inlet seal 18C may be controlled by controlling pressure within upper chamber 12C in relation to the pressure in pipe/chamber 26C. Pressure in upper chamber 12C is controlled to allow pressure release of fluid within pipe/chamber 26C through lower chamber 14C by means of inlet opening 20C and outlet opening 36C. Such control is accomplished by providing a desired fluid pressure within upper chamber 12C. When fluid pressure within pipe/chamber 26C at inlet opening 20C exceeds a determined level, inlet seal 18C is forced upward, thereby biasing plate 22C upward toward upper end 50C of upper chamber 12C, as depicted in FIG. 5. As shown in FIG. 5, upward movement of inlet seal 18C allows fluid from pipe/chamber 26C to flow through inlet opening 20C. Fluid entering lower chamber 14C through inlet 20C flows out through outlet 36C. Upon diminishment of fluid pressure within pipe/chamber 26C at inlet opening 20C to a level at or below the determined level, fluid pressure within upper chamber 12C biases plate 22C downward toward lower chamber 14C, thereby biasing inlet seal 18C back into sealing engagement with inlet opening plate 74C.

In one embodiment (not shown), pressure relief system 10C comprises a temperature control system comprising a sealed jacket similar to component 56 depicted in FIGS. 1 and 2. The temperature control system (not shown) may be adapted and configured to provide and/or maintain fluid disposed within upper chamber 12C, lower chamber 14C, and/or pipe/chamber 26C in a liquid or gaseous state. In one aspect, this would include providing/maintaining a low melting temperature material, such as sulfur, in a molten state. In one embodiment, such a temperature control system (not shown) comprises each of the features and capabilities as described above with regard to pressure relief system 10. Other embodiments of a temperature control system (not shown) may comprise steam or impedance heat tracing, or other heating/cooling mechanisms as would be appreciated by one skilled in the art.

Figure 5A:
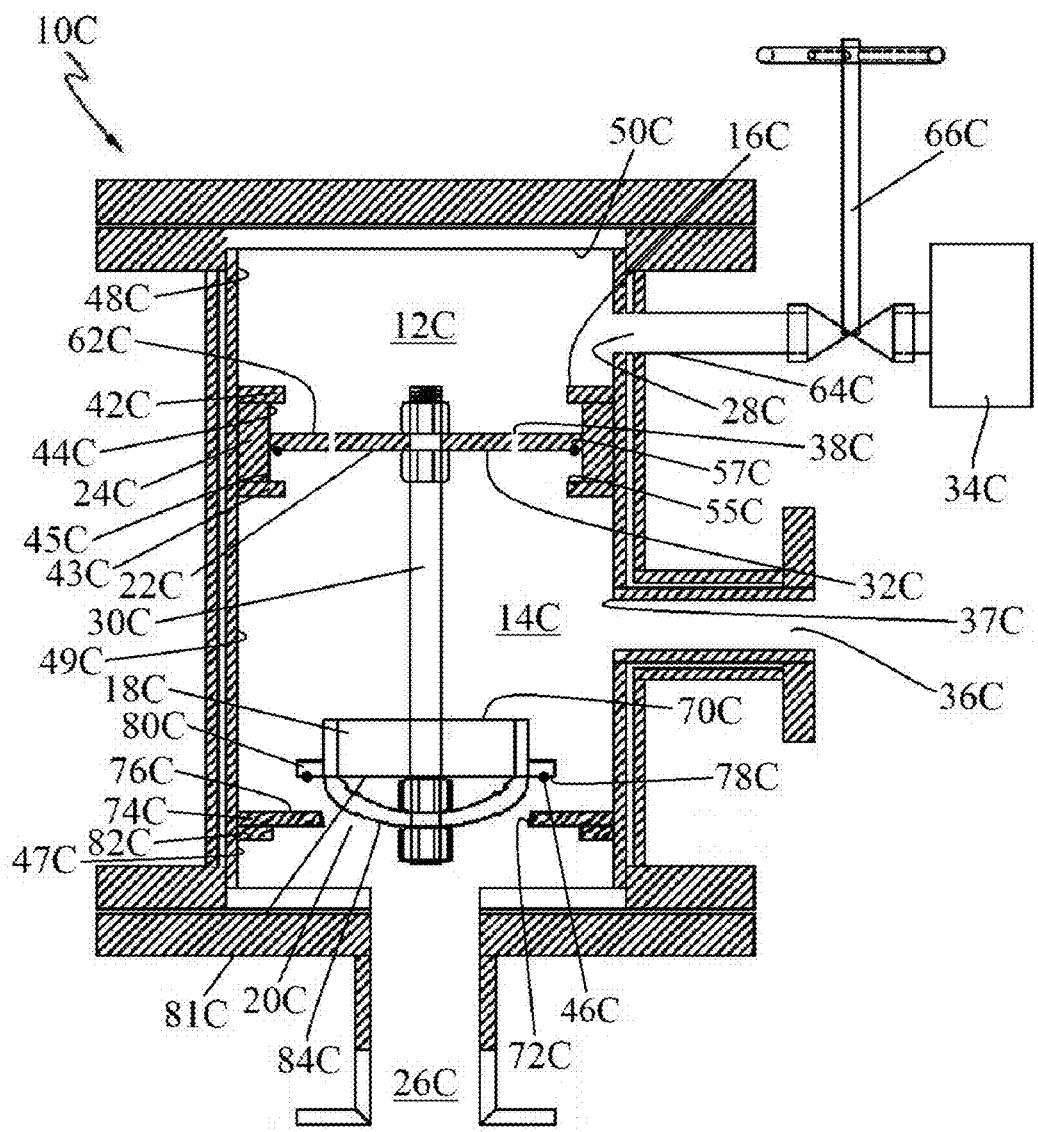
FIG. 5A is a cross-sectional view of another embodiment of a pressure relief system of the present invention.

Another embodiment of pressure relief system 10C is depicted in FIG. 5A, wherein, sealing between plate 22C and lower stop 43C is accomplished utilizing a circumferentially disposed o-ring 57C at least partially protruding from lower surface 32C of plate 22C, wherein sealing comprises contact between a portion of o-ring 57C and upper surface 55C of lower stop 43C. In one embodiment, o-ring 57C may be provided at least partially within a channel (not shown) circumferentially disposed on plate 22C lower surface 32C. As would be understood by one skilled in the art, an o-ring 57C may comprise any suitable material, such as but not limited to, an elastomer. In one embodiment, o-ring 57C comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In the embodiment of pressure relief system 10C shown in FIG. 5A, sealing between inlet seal 18C and inlet opening plate 74C is accomplished utilizing a circumferentially disposed o-ring 46C at least partially protruding from lower surface 81C of inlet seal flange 80C, wherein sealing comprises contact between a portion of o-ring 46C and upper surface 76C of inlet opening plate 74C. In one embodiment, o-ring 46C may be provided at least partially within a channel (not shown) circumferentially disposed on inlet seal flange 80C lower surface 81C. As would be understood by one skilled in the art, an o-ring 46C may comprise any suitable material, such as but not limited to, an elastomer. In one embodiment, o-ring 46C comprises a fluoroelastomer comprising tetrafluoroethylene and propylene (TFE/P), available from AGC Chemicals Americas, Inc. under the tradename AFLAS®, or a perfluoro-elastomer (perfluororubber), available from Seals Eastern, Inc. under the tradename PERFLAS®.

In other embodiments of a pressure relief system 10C (not shown), various combinations of the plate 22C sealing means depicted in FIGS. 5 and 5A, and the inlet seal 18C sealing means depicted in FIGS. 5 and 5A, may be employed as would be understood by one skilled in the art.

Figure 6:
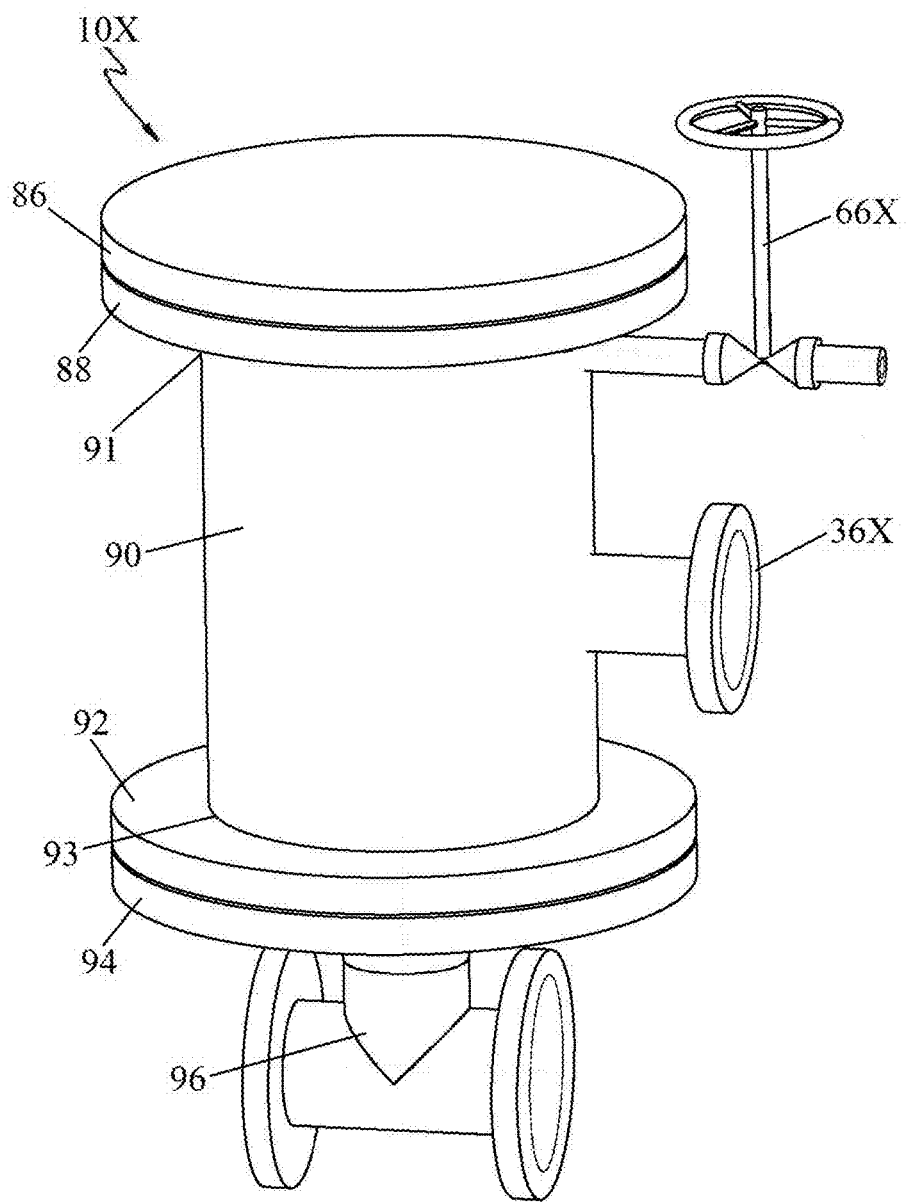
FIG. 6 is a view of an embodiment of a pressure relief system of the present invention.

FIG. 6 depicts a view of the exterior of an embodiment of a pressure relief system, such as but not limited to, pressure relief systems 10A, 10B, or 10C, of the present invention. In FIG. 6, components similar and/or identical to those described above with respect to pressure relief systems 10A, 10B, and/or 10C are correspondingly numbered. Such components comprise each of the features and capabilities as described above with regard to pressure relief systems 10A, 10B, and 10C.

In the embodiment shown in FIG. 6, a pressure relief system 10X comprises a body 90, wherein an outlet opening 36X extends outwardly therefrom. In the embodiment of FIG. 6, a valve 66X is fluidly connected to an inlet opening, (not visible in FIG. 6), comparable to an inlet opening 28A, 28B, or 28C described above. In the embodiment shown in FIG. 6, an upper end 91 of body 90 is sealed via upper flange 88 and cover flange 86, which may be removably or irremovably engaged. In the embodiment shown in FIG. 6, a lower end 93 of body 90 is fluidly connected to a pipe/chamber body 96 via lower flange 92 and pipe/chamber flange 94, which may be removably or irremovably engaged. In one pipe/chamber body 96 contains a pipe/chamber, (not visible in FIG. 6), comparable to a pipe/chamber 26A, 26B, or 26C described above. Although FIG. 6 depicts many components and features of embodiments of pressure relief systems of the present invention, other features and/or components, orientations and/or geometries, and combinations and/or connectivities may be employed, as would be understood by one skilled in the art Method A method of operating a pressure relief system of the present invention comprises the following steps:

Providing an apparatus comprising a lower chamber having a lower chamber inlet opening, the inlet opening in fluid communication with a fluid source; an outlet opening; and an upper chamber having an upper chamber inlet opening, the upper chamber inlet opening in fluid communication with a pressurized fluid source;

Providing a vertically moveable plate intermediate the lower chamber and the upper chamber, and a connector, such as a solid shaft, between the plate and a sealing component at the lower chamber inlet opening, to maintain fixed spacing of the upper plate and the sealing component, the plate vertically moveable in response to pressure differentials between provided fluid pressure in the upper chamber and pressure external to the lower chamber inlet opening from a fluid source there disposed;

Operating the pressurized fluid source to provide a controlled pressure in the upper chamber, to allow opening of the valve comprising the combination of the lower chamber inlet and the sealing component above a determined pressure of the fluid source external thereto, and closing of the valve when the pressure of the external fluid source is at or below the determined pressure.

Operation

The following general description of operation of embodiments of the pressure relief system 10 and method of the present invention is presented and is complementary to the foregoing description:

In one embodiment, pressurized fluid source 34 supplies to top chamber 12 a nitrogen or instrument air pad. The gas pressure may be supplied through a small instrument back pressure regulator (not shown). In one embodiment, the set pressure in upper chamber 12 is based on the ratio of the cross-sectional area of plate 22 and the cross-sectional area of inlet 20. For example; if the design pressure for relief is 20 psig, inlet 20 has a diameter of 4 inches, and the plate 22 has a diameter of 6 inches, then nitrogen/instrument air pressure source would be controlled to provide an upper chamber 12 pressure of about 9 psig.

At any time the pressure of the fluid for which pressure relief is desired is below the 20 psig relief point, the pressure in the upper chamber 12 would maintain a downward force on the plate 22, and hence the shaft 30, to maintain the inlet seal 18 in sealing engagement with the inlet 20, thereby preventing flow of the fluid through the inlet 20.

If the pressure exceeds the 20 psig set point, then the inlet seal 18 (as well as the shaft 30 and the plate 22) would move upward, thereby allowing fluid to flow through the inlet 20 and the fluid over-pressure to be relieved. Once the fluid pressure drops below the 20 psig, the pressure in the upper chamber 12 will force the inlet valve to close, preventing additional pressure relief.

The volume of over-pressure fluid that can be vented through lower chamber 14 is in part dependent on the total available area for relief. The total relief area is dependent on the dimensions of the inlet seal 18 in relation to inlet opening 20, and vertical movement of inlet seal 18 during a pressure relief event.

Testing of the relief valve can be accomplished by providing fluid of a known pressure to pipe/chamber 26 and determining, either by visual observation of automated means, that fluid has been communicated through lower chamber 14 and through outlet opening 36. This testing can accomplished without having to disconnect, disassemble, or take off-line pressure relief system 10.

The following general description of operation of embodiments of the pressure relief system "10X" and method of the present invention is presented and is complementary to the foregoing description; wherein common components are designated as "YX" and include components "YA," "YB," and/or "YC":

In one embodiment, pressurized fluid source 34X supplies to top chamber 12X a nitrogen or instrument air pad. The gas pressure may be supplied through a small instrument back pressure regulator (not shown). In one embodiment, the set pressure in upper chamber 12X is based on the ratio of the cross-sectional area of plate 22X and the cross-sectional area of inlet opening 20X. For example; if the design pressure for relief is 20 psig, inlet opening 20X has a diameter of 4 inches, and the plate 22X has a diameter of 6 inches, then nitrogen/instrument air pressure source would be controlled to provide an upper chamber 12X pressure of about 9 psig.

At any time the pressure of the fluid for which pressure relief is desired is below the 20 psig relief point, the pressure in the upper chamber 12X would maintain a downward force on the plate 22X, and hence the shaft 30X, to maintain the inlet seal 18X in sealing engagement with the inlet opening plate 74X, thereby preventing flow of the fluid through the inlet opening 20X.

If the pressure exceeds the 20 psig set point, then the inlet seal 18X (as well as the shaft 30X and the plate 22X) would move upward, thereby allowing fluid to flow through the inlet opening 20X and the fluid over-pressure to be relieved. Once the fluid pressure drops below the 20 psig, the pressure in the upper chamber 12X will force the inlet valve to close, preventing additional pressure relief.

The volume of over-pressure fluid that can be vented through lower chamber 14X is in part dependent on the total available area for relief. The total relief area is dependent on the dimensions of the inlet seal 18X in relation to inlet opening 20X, and vertical movement of inlet seal 18X during a pressure relief event.

Testing of the relief valve can be accomplished by providing fluid of a known pressure to pipe/chamber 26X and determining, either by visual observation of automated means, that fluid has been communicated through lower chamber 14X and through outlet opening 36X. This testing can accomplished without having to disconnect, disassemble, or take off-line pressure relief system 10X.

Variations or modifications of embodiments of the apparatus and method of the present invention are contemplated in accordance with the teachings provided herein and the general skill in the art. While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention. The extent and scope of the invention is set forth in the appended claims and is intended to extend to equivalents thereof.

I claim:

1. A pressure relief system, comprising:
   an upper chamber;
   a lower chamber;
   a plate;
   a shaft; and
   an inlet seal;
   wherein:
      said upper chamber is fluidly connectable to an external pressurized fluid source; said lower chamber comprises a fluid inlet comprising an opening, and a fluid outlet;
      said lower chamber is fluidly connected to a process chamber via said fluid inlet;
      said upper chamber is in fluid communication with said process chamber only through said lower chamber;
      said plate is vertically moveable and is disposed between said upper chamber and said lower chamber;
      said shaft connects said plate to said inlet seal and provides a fixed distance there between;
      positioning of said inlet seal in a lowest position provides sealing engagement of said inlet seal with said lower chamber fluid inlet;
      internal fluid pressure within said upper chamber biases said plate, and therefore said inlet seal, via said shaft, downward;
      upward vertical movement of said inlet seal from said lowest position disengages said inlet seal from sealing engagement thereof with said lower chamber fluid inlet; and
   fluid pressure within said process chamber sufficient to cause upward vertical movement of said inlet seal and disengage said inlet seal from said lower chamber fluid inlet provides for relief of said process chamber fluid pressure via said lower chamber fluid inlet through said lower chamber fluid outlet;
      said plate is disposed within a plate support; and
      downward movement of said plate is limited by a lower stop.

2. The apparatus of claim 1, wherein:
   positioning of said plate in a lowest position provides sealing engagement of at least a portion of a lower surface of said plate with an upper surface of said lower stop.

3. The apparatus of claim 2, wherein:
said sealing engagement of said at least a portion of said lower surface of said plate with said upper surface of said lower stop comprises at least a portion of an O-ring disposed there between.

4. The apparatus of claim 1, wherein:
at least a portion of said inlet seal comprises a substantially conically shaped exterior surface;
said fluid inlet opening comprises a beveled surface; and
said sealing engagement of said inlet seal with said lower chamber fluid inlet comprises at least a portion of an O-ring disposed between said inlet seal and said beveled edge.

5. The apparatus of claim 1, wherein:
said lower chamber fluid inlet opening is circumscribed by an inlet opening plate;
one or more guide pins extends substantially vertically upward from said inlet opening horizontal movement of said inlet seal is confined by said one or more guide pins.

6. The apparatus of claim 1, wherein:
said plate comprises one or more orifices.

7. The apparatus of claim 1, comprising:
a temperature control system.

8. A pressure relief system, comprising:
an upper chamber;
a lower chamber;
a plate;
a shaft; and
an inlet seal;
wherein:
  said upper chamber is fluidly connectable to an external pressurized fluid source;
  said lower chamber comprises a fluid inlet comprising an opening, and a fluid outlet;
  said lower chamber is fluidly connected to a process chamber via said fluid inlet;
  said upper chamber is in fluid communication with said process chamber only through said lower chamber;
  said plate is vertically moveable and is disposed between said upper chamber and said lower chamber;
  said shaft connects said plate to said inlet seal and provides a fixed distance there between;
  said inlet seal comprises a flange extending circumferentially there around;
  said lower chamber fluid inlet opening is circumscribed by an inlet opening plate;
  positioning of said inlet seal in a lowest position provides sealing engagement of at least a portion of a lower surface of said inlet seal flange with an upper surface of said inlet opening plate;
  internal fluid pressure within said upper chamber biases said plate, and therefore said inlet seal, via said shaft, downward;
  upward vertical movement of said inlet seal from said lowest position disengages said inlet seal flange from sealing engagement thereof with said inlet opening plate;
fluid pressure within said process chamber sufficient to cause upward vertical movement of said inlet seal and disengage said inlet seal from said lower chamber fluid inlet provides for relief of said process chamber fluid pressure via said lower chamber fluid inlet through said lower chamber fluid outlet; and
  said sealing engagement of said at least a portion of said lower surface of said inlet seal flange with said upper surface of said inlet opening plate comprises at least a portion of an O-ring disposed there between.

9. The apparatus of claim 8, wherein:
said plate is disposed within a plate support; and
downward movement of said plate is limited by a lower stop.

10. The apparatus of claim 9, wherein:
positioning of said plate in a lowest position provides sealing engagement of at least a portion of a lower surface of said plate with an upper surface of said lower stop.

11. The apparatus of claim 10, wherein:
said sealing engagement of said at least a portion of said lower surface of said plate with said upper surface of said lower stop comprises at least a portion of an O-ring disposed there between.

12. The apparatus of claim 8, wherein:
one or more guide pins extends substantially vertically upward from said inlet opening plate; and
horizontal movement of said inlet seal is confined by said one or more guide pins.

13. The apparatus of claim 8, comprising:
an inlet opening plate support positioned at least partially beneath said inlet opening plate.

14. The apparatus of claim 8, wherein:
at least a portion of said inlet seal comprises a substantially conically shaped exterior surface.

15. The apparatus of claim 8, wherein:
at least a portion of said inlet seal comprises a substantially semi-elliptically shaped exterior surface.

16. The apparatus of claim 8, wherein:
said plate comprises one or more orifices.

17. The apparatus of claim 8, comprising:
a temperature control system.

18. A method of relieving fluid pressure, comprising:
providing an apparatus comprising:
  an upper chamber;
  a lower chamber;
  a plate;
  a shaft; and
  an inlet seal;
wherein:
  said upper chamber is fluidly connectable to an external pressurized fluid source;
  said lower chamber comprises a fluid inlet comprising an opening, and a fluid outlet;
  said lower chamber is fluidly connected to a process chamber via said fluid inlet;
  said upper chamber is in fluid communication with said process chamber only through said lower chamber;
  said plate is vertically moveable and is disposed between said upper chamber and said lower chamber;
  said shaft connects said plate to said inlet seal and provides a fixed distance there between;
  said inlet seal comprises a flange extending circumferentially there around;
  said lower chamber fluid inlet opening is circumscribed by an inlet opening plate;
  positioning of said inlet seal in a lowest position provides sealing engagement of at least a portion of a lower surface of said inlet seal flange with an upper surface of said inlet opening plate, wherein said sealing engagement of said at least a portion of said lower surface of said inlet seal flange with said upper surface of said inlet opening plate comprises at least a portion of an O-ring disposed there between;

internal fluid pressure within said upper chamber biases said plate, and therefore said inlet seal, via said shaft, downward;

upward vertical movement of said inlet seal from said lowest position disengages said inlet seal flange from sealing engagement thereof with said inlet opening plate; and fluid pressure within said process chamber sufficient to cause upward vertical movement of said inlet seal and disengage said inlet seal from said lower chamber fluid inlet provides for relief of said process chamber fluid pressure via said lower chamber fluid inlet through said lower chamber fluid outlet;

providing pressurized fluid from said external pressurized fluid source to the interior of said upper chamber; and providing a process fluid within said process chamber.

19. The method of claim 18, wherein:
said process fluid source comprises sulfur.

20. The method of claim 18, wherein:
one or more guide pins extends substantially vertically upward from said inlet opening plate; and
horizontal movement of said inlet seal is confined by said one or more guide pins.

21. The method of claim 18, wherein:
said apparatus comprises an inlet opening plate support positioned at least partially beneath said inlet opening plate.

22. The method of claim 18, comprising:
controlling the temperature of at least a portion of said apparatus.

23. The method of claim 18, wherein:
said plate is disposed within a plate support; and
downward movement of said plate is limited by a lower stop.

24. The method of claim 23, wherein:
positioning of said plate in a lowest position provides sealing engagement of at least a portion of a lower surface of said plate with an upper surface of said lower stop.

25. The method of claim 24, wherein:
said sealing engagement of said at least a portion of said lower surface of said plate with said upper surface of said lower stop comprises at least a portion of an O-ring disposed there between.

* * * * *

UNITED STATES PATENT AND TRADEMARK OFFICE
CERTIFICATE OF CORRECTION

PATENT NO. : 10,054,236 B2  
APPLICATION NO. : 15/668263  
DATED : August 21, 2018  
INVENTOR(S) : Strom W. Smith Page 1 of 1

It is certified that error appears in the above-identified patent and that said Letters Patent is hereby corrected as shown below:

In the Claims

Column 21, Line 18, that portion of Claim 5 reading "opening horizontal" should read --opening plate; and horizontal--.

Signed and Sealed this  
Second Day of October, 2018

Andrei Iancu  
*Director of the United States Patent and Trademark Office*